(12) United States Patent
Bode

(10) Patent No.: US 8,260,703 B2
(45) Date of Patent: Sep. 4, 2012

(54) PAYROLL MANAGEMENT METHOD AND APPARATUS

(75) Inventor: Russell Bode, Mulgrave (AU)

(73) Assignee: Third Millennium Management Pty Ltd, Victoria (AU)

( * ) Notice: Subject to any disclaimer, the term of this patent is extended or adjusted under 35 U.S.C. 154(b) by 1684 days.

(21) Appl. No.: 11/342,612

(22) Filed: Jan. 31, 2006

(65) Prior Publication Data

US 2006/0122878 A1    Jun. 8, 2006

Related U.S. Application Data

(62) Division of application No. 09/738,352, filed on Dec. 18, 2000, now Pat. No. 7,089,200.

(60) Provisional application No. 60/172,795, filed on Dec. 21, 1999.

(51) Int. Cl.
*G06Q 40/00* (2006.01)
(52) U.S. Cl. ......................................................... 705/39
(58) Field of Classification Search .................. 705/39
See application file for complete search history.

(56) References Cited

U.S. PATENT DOCUMENTS

| | | | | |
|---|---|---|---|---|
| 5,016,170 A * | 5/1991 | Pollalis et al. | ............ | 705/7 |
| 5,216,593 A * | 6/1993 | Dietrich et al. | ............ | 345/467 |
| 5,563,783 A * | 10/1996 | Stolfo et al. | ............ | 705/8 |
| 5,617,342 A * | 4/1997 | Elazouni | ............ | 703/6 |
| 5,671,403 A * | 9/1997 | Shekita et al. | ............ | 707/3 |
| 5,717,867 A * | 2/1998 | Wynn et al. | ............ | 705/32 |
| 5,748,907 A * | 5/1998 | Crane | ............ | 705/2 |
| 5,913,199 A * | 6/1999 | Dueck et al. | ............ | 705/7 |
| 5,913,201 A * | 6/1999 | Kocur | ............ | 705/9 |
| 5,918,219 A * | 6/1999 | Isherwood | ............ | 705/37 |
| 6,154,705 A * | 11/2000 | McCormack et al. | ............ | 702/17 |
| 6,216,108 B1 * | 4/2001 | LeVander | ............ | 705/7 |
| 6,347,306 B1 * | 2/2002 | Swart | ............ | 705/32 |
| 7,089,200 B2 * | 8/2006 | Bode | ............ | 705/32 |
| 7,249,045 B2 * | 7/2007 | Lauffer | ............ | 705/8 |
| 7,542,441 B2 * | 6/2009 | Choi et al. | ............ | 370/328 |
| 2001/0032119 A1 * | 10/2001 | Bode | ............ | 705/11 |

(Continued)

OTHER PUBLICATIONS

North Carolina Department of Environment and Natural Resources, "Procedures" Human Resources, Hours of Work, Compensatory Time, and Overtime Pay for Subject Employees, Jan. 3, 1994, and revised Aug. 4, 1997, p. 1-4.*

(Continued)

*Primary Examiner* — Romain Jeanty
(74) *Attorney, Agent, or Firm* — Stites & Harbison PLLC; Marvin Petry; Stephen J. Weyer

(57) ABSTRACT

The present invention provides a method and apparatus for costing a roster. The method includes preparing a roster in a roster preparing means of the apparatus, said roster comprising a work schedule or list of duties for one or more work periods, each work period being populated by one or more workers, providing award information in a database of the apparatus for calculating a payroll for each of said workers in said roster, and calculating a roster wage cost in a processing means of the apparatus that would result from implementation of said roster, based on said roster and said award information. A respective pay-rate for a respective worker in the database of award information may depend on the work period populated by said respective worker, and a respective worker may be rostered in more than one of said work periods.

9 Claims, 3 Drawing Sheets

U.S. PATENT DOCUMENTS

| | | | |
|---|---|---|---|
| 2004/0111168 A1* | 6/2004 | Watanabe et al. | 700/28 |
| 2004/0162748 A1* | 8/2004 | Vogel et al. | 705/8 |
| 2004/0162749 A1* | 8/2004 | Vogel et al. | 705/8 |
| 2004/0162753 A1* | 8/2004 | Vogel et al. | 705/10 |
| 2004/0215475 A1* | 10/2004 | Maglaris et al. | 705/1 |
| 2006/0050702 A1* | 3/2006 | Matsui et al. | 370/392 |
| 2006/0080116 A1* | 4/2006 | Maguire et al. | 705/1 |
| 2006/0122878 A1* | 6/2006 | Bode | 705/11 |
| 2007/0185790 A1* | 8/2007 | Gardner | 705/30 |
| 2008/0172311 A1* | 7/2008 | Curran | 705/32 |

OTHER PUBLICATIONS

Fredrick S. Hillier and Gerald J. Lieberman, Introduction to Operations Research, Fourth Edition, copyright 1996, by Holden-Day, Inc., Chapter One, The Nature of Operations Research, specifically p. 6, middle of the page, item 1.*

* cited by examiner

PAYROLL MANAGEMENT METHOD AND APPARATUS

RELATED APPLICATIONS

This application is divided from and claims the benefit of U.S. patent application Ser. No. 09/738,352 filed 18 Dec. 2000 now U.S. Pat. No. 7,089,200, which claims priority from U.S. Provisional Patent Application No. 60/172,795 filed 21 Dec. 1999, the content of both of which is incorporated herein by reference.

FIELD OF THE INVENTION

The present invention relates to a method and apparatus for managing payrolls, of the type where employees are paid according to the time actually attended or worked.

BACKGROUND OF THE INVENTION

Existing systems for managing payrolls of this type typically require the preparation of rosters, and the entering by employees (whether by time clock or time sheet, etc) of the time actually worked. The time actually worked will commonly not correspond exactly to the rostered hours, owing to employee illness, late attendance, overtime, early departure, etc.

Details of the accumulated time worked—as recorded on a time sheet or otherwise—is passed to and authorised by a supervisor, and then sent to payroll administration for processing. The times and accumulated hours actually worked are compared with the roster so that habitual diligence or tardiness, absences due to sickness etc, or any other significant issue can be monitored, recorded and appropriate action—if any—taken.

Payroll administration posts all wage amounts to specific accounts in the general ledger and accrual accounts for future payments. Statutory reports and EFT (electronic funds transfer) submissions are undertaken and the appropriate sums forwarded to the relevant authority or financial institution. Payroll administration must also prepare pay slips, which are distributed to each employee with—if EFT is not used—pay attached.

Periodically, statements of yearly earnings and income tax deductions, etc (referred to in some jurisdictions as "Group Certificates") may be prepared and distributed.

A flow chart for an example of such a prior art system is shown at 100 in FIG. 1, from the step 102 of recruiting employees through steps 104 to 110, to the ultimate step 122 of the issuing of Group Certificates.

Such prior art systems, however, require a large quantity of data entry, including into the initial roster, into time sheets, and into the payroll administration system.

SUMMARY OF THE INVENTION

It is an object of the present invention to provide a method and apparatus for costing a roster that reduces the amount of data entry required by combining a number of these steps.

According to the present invention, therefore, there is provided a method for use in an apparatus for costing a roster, the method comprising:

preparing a roster in a roster preparing means of the apparatus, said roster comprising a work schedule or list of duties for one or more work periods, each work period being populated by one or more workers;

providing award information in a database of the apparatus for calculating a payroll for each of said workers in said roster; and calculating a roster wage cost in a processing means of the apparatus that would result from implementation of said roster, based on said roster and said award information;

wherein a respective pay-rate for a respective worker in the database of award information may depend on the work period populated by said respective worker, and a respective worker may be rostered in more than one of said work periods.

The invention also provides an apparatus for costing a roster, comprising:

roster preparation means, said roster comprising a work schedule or list of duties for one or more work periods, each work period being populated by one or more workers;

a database of award information for calculating a payroll for each of said workers in said roster; and processing means for calculating a roster wage cost that would result from implementation of said roster, based on said roster and said award information;

wherein a respective pay-rate for a respective worker may depend on the work period populated by said respective worker, and a respective worker may be rostered in more than one of said work periods.

The term "attendance information" is used herein to refer to any measure of the time worked by a worker. In some cases a worker may be employed in a number of different capacities within the one workplace, each capacity having a different pay rate. In such cases, the attendance information would preferably include information pertaining to the attendance of the worker in each separate capacity.

The attendance information preferably includes arrival or commencement time, and departure or finishing time.

The present also provides a computer program product directly loadable into the internal memory of a computer, comprising software code portions for performing the steps of the method described above when the product is run on a computer.

The present invention still further provides a computer program product stored on a computer useable medium, comprising computer readable program means for causing a computer to perform the steps of a method as described above.

The present invention still further provides a computer readable medium, having a program recorded thereon, wherein said program is for making a computer execute a method as described above.

BRIEF DESCRIPTION OF THE DRAWING

A preferred embodiment of the present invention will now be described, by way of example, with reference to the accompanying drawings, in which.

DETAILED DESCRIPTION OF THE PREFERRED EMBODIMENT

Figure 1:
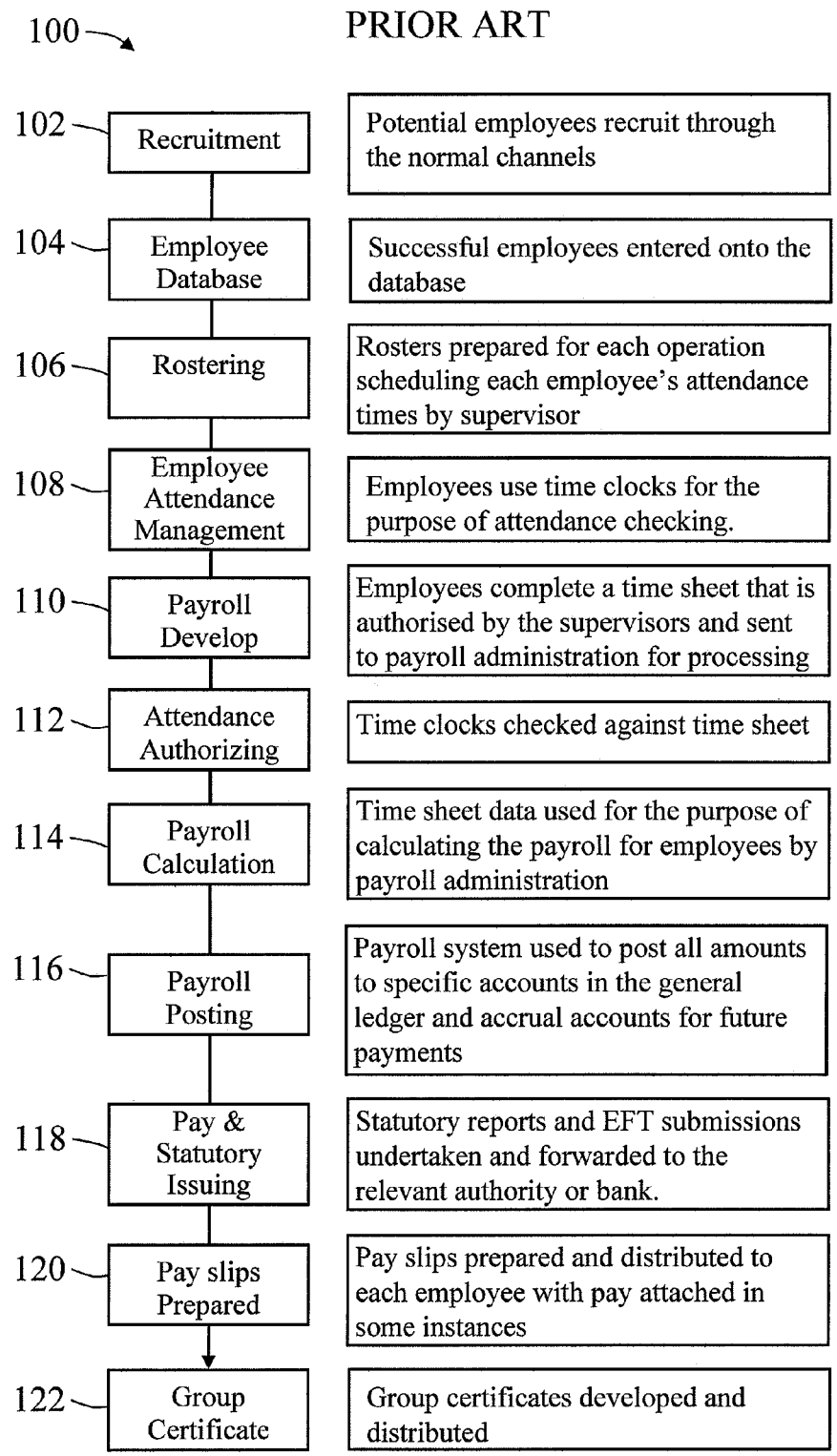
FIG. 1 is a flow chart of a prior art payroll management system.
Figure 2:
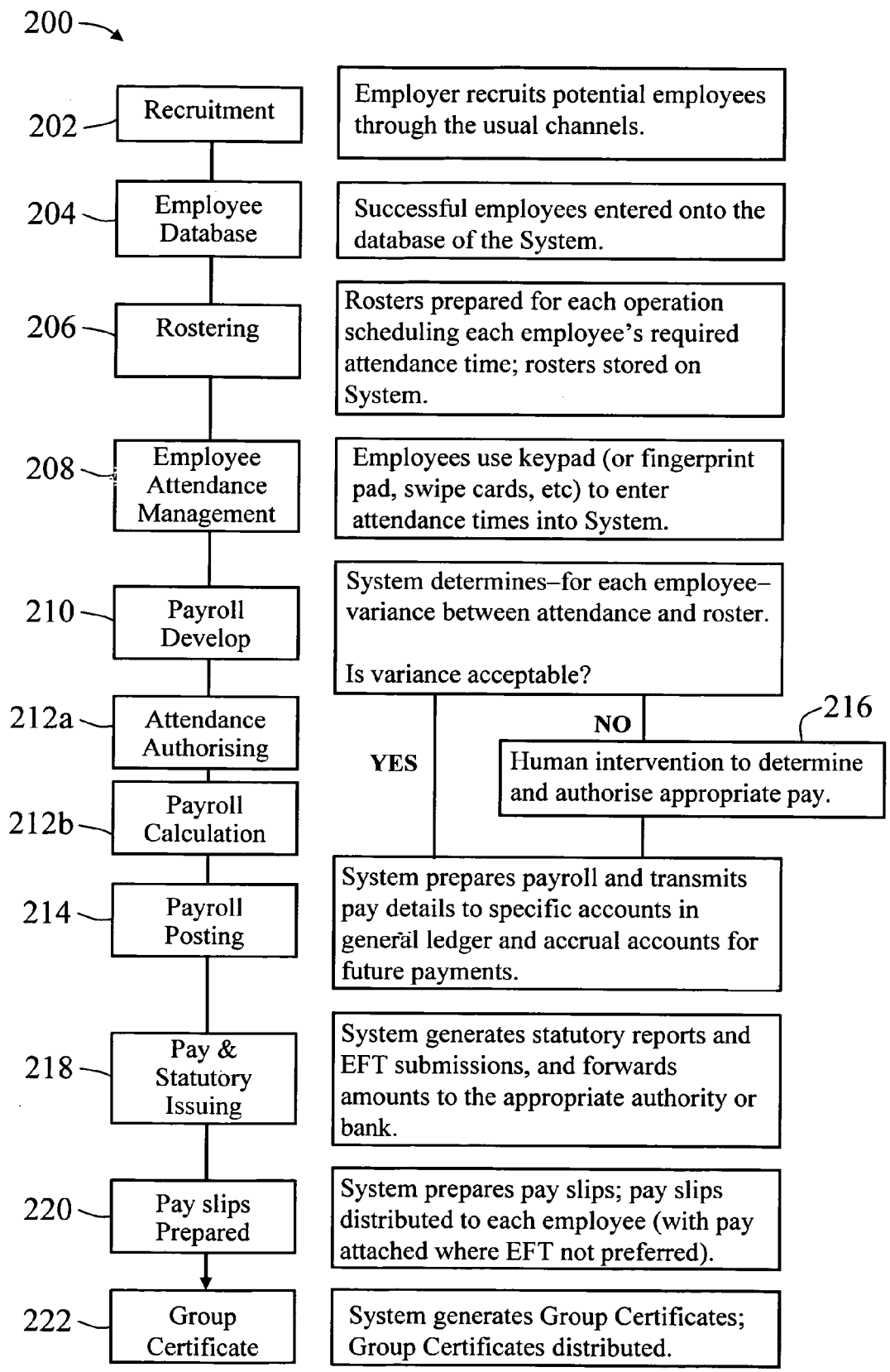
FIG. 2 is a flow chart of a payroll management system according to a preferred embodiment of the present invention.

A flow chart of a payroll management system according to a preferred embodiment of the present invention is shown in FIG. 2 at 200. The system includes a computer running a program that carries out each of the functions (other than those requiring human intervention) described below.

Potential employees are recruited 202 through normal channels, and successful employees entered 204 onto a database of the system.

A roster is developed 206 (preferably on the system directly) and stored on the system, for each operation within an organisation.

Figure 3:
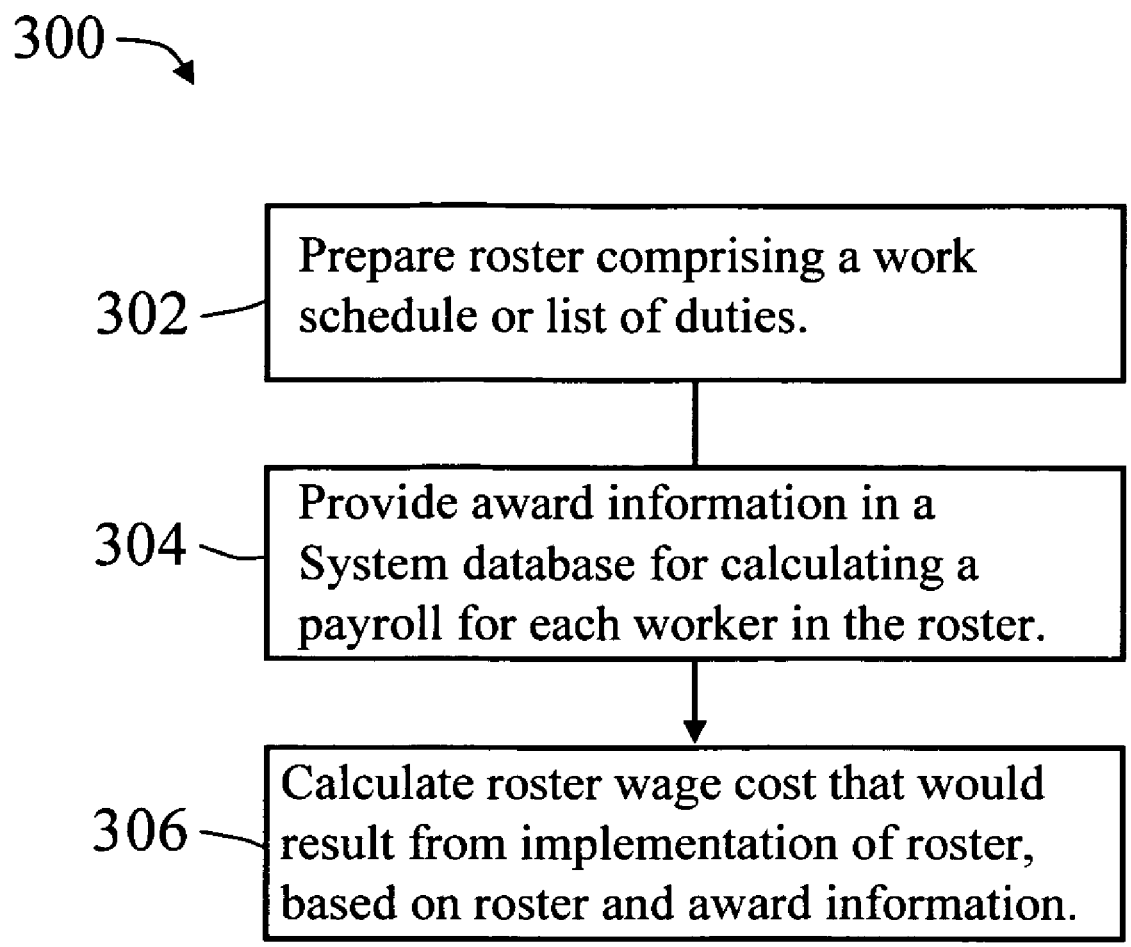
FIG. 3 is a flow chart of the payroll costing method of the payroll management system of the preferred embodiment of the present invention.

As a part of or following step 206, each roster is costed by the system. This is performed as shown in flowchart 300 of FIG. 3. After preparing the roster at step 302, at step 304 wage rate or "award" information is provided in a database of the system. This award information is suitable for calculating a payroll for each worker in the roster. At step 306, the roster wage cost is calculated in a processing means of the system. This cost is the cost that would result from implementation of the roster, based on the roster and the award information. In this process, the respective pay-rate for a respective worker in the database of award information may depend on the work period populated by the respective worker; also, a respective worker may be rostered in more than one of said work periods.

Each roster incorporates the planned or required attendance of each employee of the respective department within that organisation. Management advises employees of their required attendance over a specified period of time by means of such a roster.

Employees record 208 their actual attendance by means of electronic time clocks linked to the system, and operated with a keypad. Each employee is allocated a Personal Identification Numbers (PIN), which is entered upon arrival and at departure. The system identifies the employee on the basis of the PIN, and records arrival and departure times for that employee.

In other preferred embodiments, a fingerprint identification pad is provided instead of a keypad and PIN: an employee places a finger or thumb as required on the pad so that the system can identify the employee and record the corresponding arrival or departure time.

Attendance for each employee is then automatically compared 210 by the system with the roster of that employee and, if they are in agreement 212a, the appropriate pay is calculated 212b: no further input is required. The pay data can then be forwarded 214 electronically from the system to the general ledger, paymaster or even directly to the bank for the payment of the employee's wages and other benefits.

If the time and attendance function identifies a variance between the roster and the times of attendance of that employee, the system will flag the variance and require the human intervention 216 of management to decide on what basis that employee will be paid for the relevant period. It may be that a reduced pay is deemed appropriate, or—if management have been notified of a legitimate excuse (such as one due to illness or compassionate leave)—the appropriate sick pay etc calculated. This function can be undertaken at the point of the pay authorization or payroll run.

As described above, the system includes a database containing wage rate data (in some jurisdictions termed "awards") to enable the aforementioned calculation of the appropriate pay. This data is also used to calculate statutory charges associated with the employment of each employee. The system also uses this data to predict the projected payroll cost of a particular roster.

Once each part of the payroll has been approved (by the system where attendance/roster variance is within an acceptable level, or manually where not) pay can be electronically forwarded to the appropriate accounts 218.

The system then generates 220 the necessary pay slips for the employees, and payroll reports (including details of variance from the roster, wages, superannuation, tax deductions, etc, as well as wage cost predictions) for management. At step 222 the system generates Group Certificates, which are then distributed.

As the rosters are stored by the system, the rosters can be copied from previous periods to expedite the development of specific subsequent rosters which are tailored for specific trading conditions.

The system can also be used to process pays without the need for a formal time of attendance process by way of the approving the pay by using the pay roster function. This can be used in instances that an employee does not want to verify attendance of all or some of the employees.

The system also allows employees to access their own rosters, attendance details and pay details, thereby reducing the cost of distributing such data and material. It also enables employees who do not wish to receive formal documents of their pays etc other than their bank details not to receive them. This function lowers the cost of payroll processing Further, employees can access the system to notify non-availability for specific future periods, to ensure that rosters prepared subsequently by management only include available employees.

Modifications within the scope of the invention may be readily effected by those skilled in the art. It is to be understood, therefore, that this invention is not limited to the particular embodiments described by way of example hereinabove.

The claims defining the invention are as follows:

1. A method for use in an apparatus for costing a roster, the method comprising:
    preparing a roster and storing the roster in the apparatus, said roster comprising a work schedule or list of duties for one or more work periods, each work period being populated by one or more workers;
    providing award information in a database of the apparatus for each worker in the roster, said award information comprising a respective pay-rate for each worker for calculating a payroll for each of said workers in said roster; and
    calculating a roster wage cost in a processor of the apparatus that would result from implementation of said roster, based on said roster and said award information,
    wherein the roster wage cost is determined based on the roster and not the actual work performed or duties completed by one or more workers, and
    wherein the respective pay-rate for a respective worker in the database of award information depends on the work period populated by said respective worker, and a respective worker may be rostered in more than one of said work periods.

2. The method of claim 1, wherein the pay-rate information is based on the work period populated by the respective worker.

3. The method of claim 1, wherein the roster wage cost represents the cost to an employer for implementing the roster.

4. An apparatus for costing a roster, comprising:
    a roster stored in memory, said roster comprising a work schedule or list of duties for one or more work periods, each work period being populated by one or more workers;

an electronic database of award information for calculating a payroll for each of said workers in said roster; and a processor for calculating a roster wage cost that would result from implementation of said roster, based on said roster and said award information;

wherein the roster wage cost is determined based on the roster and not the actual work performed or duties completed by one or more workers, and wherein a respective pay-rate for a respective worker being rostered depends on the work period populated by said respective worker, and a respective worker may be rostered in more than one of said work periods.

5. An article of manufacture or computer program product, comprising executable instructions or software for performing a method of costing a roster when said product is run on a computer, said method comprising:

preparing a roster comprising a work schedule or list of duties for one or more work periods, each work period being populated by one or more workers;

providing award information in a database for calculating a payroll for each of said workers in said roster, said award information comprising a respective pay-rate for each worker; and calculating a roster wage cost that would result from implementation of said roster, based on said roster and said award information;

wherein the roster wage cost is determined based on the roster and not the actual work performed or duties completed by one or more workers, and wherein the respective pay-rate for a respective worker in the database of award information depends on the work period populated by said respective worker, and a respective worker may be rostered in more than one of said work periods.

6. An article of manufacture or computer program product imbedded or permanently stored on a computer readable medium, comprising executable instructions or a computer readable program for causing a computer to perform a method of costing a roster, wherein said method comprising:

preparing a roster comprising a work schedule or list of duties for one or more work periods, each work period being populated by one or more workers;

providing award information in a database for calculating a payroll for each of said workers in said roster, said award information comprising a respective pay-rate for each worker; and calculating a roster wage cost that would result from implementation of said roster, based on said roster and said award information;

wherein the roster wage cost is determined based on the roster and not the actual work performed or duties completed by one or more workers, and wherein a respective pay-rate for a respective worker in the database of award information depends on the work period populated by said respective worker, and a respective worker may be rostered in more than one of said work periods.

7. A computer readable medium, having executable instructions or software, imbedded or permanently stored that, when executed by a computer or processor of a computer, cause the computer or processor of the computer to perform a method of costing a roster, said method comprising:

preparing a roster comprising a work schedule or list of duties for one or more work periods, each work period being populated by one or more workers;

providing award information in a database for calculating a payroll for each of said workers in said roster, said award information comprising a respective pay-rate for each worker; and calculating a roster wage cost that would result from implementation of said roster, based on said roster and said award information;

wherein the roster wage cost is determined based on the roster and not the actual work performed or duties completed by one or more workers, and wherein a respective pay-rate for a respective worker in the database of award information depends on the work period populated by said respective worker, and a respective worker may be rostered in more than one of said work periods.

8. The computer readable medium of claim 7, wherein the roster wage cost is implemented based on the roster and the award information and not on actual work performed or duties completed by one or more workers.

9. The article of manufacture of claim 6, wherein the roster wage cost is implemented based on the roster and the award information and not on actual work performed or duties completed by one or more workers.

* * * * *